United States Patent
Xu et al.

(10) Patent No.: US 10,694,607 B1
(45) Date of Patent: Jun. 23, 2020

(54) ELECTRONIC DEVICES WITH LIGHT SENSOR WAVEGUIDES

(71) Applicant: Apple Inc., Cupertino, CA (US)

(72) Inventors: Tingjun Xu, San Jose, CA (US); Guocheng Shao, Campbell, CA (US); Lei Yu, Shanghai (CN); Ove Lyngnes, Carmel Valley, CA (US); Sunggu Kang, San Jose, CA (US); Tianbo Sun, Sunnyvale, CA (US); Xianwei Zhao, Fremont, CA (US); Xiaoyong Fu, Cupertino, CA (US); Xingxing Cai, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/450,813

(22) Filed: Jun. 24, 2019

(51) Int. Cl.
*H05B 37/02* (2006.01)
*H05B 47/11* (2020.01)
*F21V 8/00* (2006.01)
*G02B 5/28* (2006.01)

(52) U.S. Cl.
CPC ............ *H05B 47/11* (2020.01); *G02B 5/285* (2013.01); *G02B 6/0035* (2013.01); *G02B 6/0041* (2013.01); *G09G 2360/144* (2013.01)

(58) Field of Classification Search
CPC .............................................. G09G 2360/144
USPC .................. 315/149; 362/615, 627, 629, 632
See application file for complete search history.

(56) References Cited

U.S. PATENT DOCUMENTS

| | | |
|---|---|---|
| 4,594,995 A | 6/1986 | Garrison |
| 5,629,515 A | 5/1997 | Maekawa |
| 5,925,453 A | 7/1999 | Kase et al. |
| 6,078,704 A | 6/2000 | Bischel et al. |
| 7,006,741 B1 | 2/2006 | Yu |
| 7,482,574 B2 | 1/2009 | Wang |
| 8,073,300 B2 | 12/2011 | Harle et al. |
| 8,096,695 B2 | 1/2012 | Ong |
| 8,434,909 B2 | 5/2013 | Nichol et al. |
| 8,788,002 B2 | 7/2014 | LeBoeuf et al. |
| 8,797,269 B2 | 8/2014 | Broga et al. |
| 8,905,610 B2 | 12/2014 | Coleman et al. |
| 8,912,480 B2 * | 12/2014 | Pope ..................... G01J 1/0422 250/221 |
| 9,052,771 B2 | 6/2015 | Goertz et al. |
| 9,110,200 B2 | 8/2015 | Nichol et al. |

(Continued)

FOREIGN PATENT DOCUMENTS

| | | |
|---|---|---|
| EP | 2273309 | 5/2016 |
| JP | 2001133623 A | 5/2001 |
| JP | 2008303130 A | 12/2008 |

*Primary Examiner* — Thuy V Tran
(74) *Attorney, Agent, or Firm* — Treyz Law Group, P.C.; G. Victor Treyz; David K. Cole (57) ABSTRACT

An electronic device may have a housing with a display. A transparent portion of the housing may serve as a display cover layer and may overlap an array of pixels in the display. The array of pixels may form an active area of the display for displaying images for a user. An ambient light sensor window may be formed in an inactive area of the display that does not overlap pixels. An ambient light sensor may be mounted in an interior region of the housing. A metal-coated light guide may have a first end aligned with the ambient light sensor window to receive ambient light from an exterior region surrounding the device and may have a second end at which the ambient light is provided to the ambient light sensor.

17 Claims, 3 Drawing Sheets

(56) References Cited

U.S. PATENT DOCUMENTS

| | | |
|---|---|---|
| 9,366,752 B2 | 6/2016 | Ruh |
| 9,523,807 B2 | 12/2016 | Niochol et al. |
| 9,612,170 B2 | 4/2017 | Vosgueritchian et al. |
| 9,658,706 B2 | 5/2017 | Ahn |
| 9,671,643 B2 | 6/2017 | Woestenborghs et al. |
| 9,778,076 B2 | 10/2017 | Lee et al. |
| 9,843,014 B2 | 12/2017 | Xu et al. |
| 9,846,473 B1 | 12/2017 | Kalscheur et al. |
| 9,891,098 B2 | 2/2018 | Shedletsky |
| 9,958,576 B2 | 5/2018 | Kawashima et al. |
| 10,128,890 B2 | 11/2018 | Thomas et al. |
| 10,131,280 B2 | 11/2018 | DeWind et al. |
| 10,139,294 B2 | 11/2018 | Vosgueritchian et al. |
| 10,175,413 B2 | 1/2019 | Nichol et al. |
| 2002/0030906 A1 | 3/2002 | Buczek et al. |
| 2005/0099678 A1 | 5/2005 | Wang |
| 2005/0185267 A1 | 8/2005 | Ockenfuss et al. |
| 2005/0276566 A1 | 12/2005 | Iimura |
| 2006/0008654 A1 | 1/2006 | Veerasamy |
| 2008/0102282 A1 | 5/2008 | Hu et al. |
| 2008/0226925 A1 | 9/2008 | Blacker et al. |
| 2008/0262321 A1 | 10/2008 | Erad et al. |
| 2010/0286791 A1 | 11/2010 | Goldsmith |
| 2011/0227487 A1 | 9/2011 | Nichol et al. |
| 2011/0273906 A1 | 11/2011 | Nichol et al. |
| 2011/0277361 A1 | 11/2011 | Nichol et al. |
| 2011/0217018 A1 | 12/2011 | Choe et al. |
| 2012/0019920 A1 | 1/2012 | Mongan et al. |
| 2012/0170284 A1 | 7/2012 | Shedletsky |
| 2012/0236303 A1 | 9/2012 | Marple et al. |
| 2012/0299175 A1 | 11/2012 | Tran |
| 2013/0155723 A1 | 6/2013 | Coleman |
| 2013/0181896 A1 | 7/2013 | Gruhlke et al. |
| 2013/0250618 A1 | 9/2013 | Nichol et al. |
| 2014/0049983 A1 | 2/2014 | Nichol et al. |
| 2014/0110738 A1 | 4/2014 | Yokobayashi et al. |
| 2014/0163664 A1 | 6/2014 | Goldsmith |
| 2015/0078035 A1 | 3/2015 | Nichol et al. |
| 2015/0268399 A1* | 9/2015 | Futterer .................. G02B 6/005 |
| | | 315/151 |
| 2015/0277001 A1 | 10/2015 | Kuriyama et al. |
| 2015/0293284 A1 | 10/2015 | Tatemura |
| 2016/0307542 A1 | 10/2016 | Zheng et al. |
| 2016/0343949 A1 | 11/2016 | Seo et al. |
| 2017/0045669 A1 | 2/2017 | Nichol et al. |
| 2017/0051884 A1 | 2/2017 | Raring et al. |
| 2017/0055906 A1 | 3/2017 | Bremer |
| 2017/0117336 A1 | 4/2017 | Rappoport et al. |
| 2017/0173262 A1 | 6/2017 | Veltz |
| 2017/0229059 A1* | 8/2017 | Bonnier .................. G06F 3/044 |
| 2018/0031745 A1 | 2/2018 | Kim et al. |
| 2018/0052274 A1 | 2/2018 | Nichol et al. |
| 2018/0081085 A1* | 3/2018 | Ge .......................... G02B 1/115 |
| 2018/0081100 A1* | 3/2018 | Wang ..................... G02B 5/285 |
| 2018/0359343 A1 | 12/2018 | Lee et al. |
| 2018/0364095 A1 | 12/2018 | Nagaya et al. |
| 2019/0080668 A1 | 3/2019 | Holenarsipur et al. |
| 2019/0094069 A1* | 3/2019 | Xu ............................ G01J 1/16 |
| 2019/0098748 A1 | 3/2019 | Guo et al. |
| 2019/0154439 A1 | 5/2019 | Binder |
| 2019/0170928 A1 | 6/2019 | Nichol et al. |
| 2019/0247050 A1 | 8/2019 | Goldsmith |

* cited by examiner

ELECTRONIC DEVICES WITH LIGHT SENSOR WAVEGUIDES

FIELD

This relates generally to electronic devices, and, more particularly, to electronic devices with optical components such as light sensors.

BACKGROUND

Electronic devices may have optical components such as light sensors. For example, electronic devices may have ambient light sensors for measuring ambient light levels. During operation of an electronic device with an ambient light sensor, display brightness can be adjusted based on measured ambient light levels. In devices with color ambient light sensors, display color cast can be adjusted based on measured ambient light color.

It can be challenging to incorporate an ambient light sensor into an electronic device. If care is not taken, the presence of an ambient light sensor may adversely affect a device's appearance or an ambient light sensor may not gather ambient light readings accurately.

SUMMARY

An electronic device may have a housing with a display. A transparent portion of the housing may serve as a display cover layer and may overlap an array of pixels in the display. The array of pixels may form an active area of the display for displaying images for a user. An ambient light sensor window may be formed in an inactive area of the display that does not overlap pixels or other portion of the electronic device. An ambient light sensor may be mounted in an interior region of the housing. A metal-coated light guide may have a first end aligned with the ambient light sensor window to receive ambient light from an exterior region surrounding the device and may have a second end at which the ambient light is provided to the ambient light sensor.

The light guide may have a first set of one or more dielectric layers on an exterior surface of a transparent light guide core. The light guide core may be formed from polymer or glass and may include optional light-scattering structures.

The first set of layers may include a layer of material that adheres to the light guide core. The first set of layers may also include a layer that exhibits satisfactory adhesion to a metal coating layer. Multiple thin-film dielectric layers in the first let of layers may be configured to form a thin-film interference filter mirror structure that exhibits high reflectivity for rays of light traveling down the light guide core and reflecting from the coatings on the light guide core. The inclusion of the thin-film interference filter mirror structure may help enhance light guide transmission.

The light guide may also have a second set of one or more dielectric layers on an exterior surface of the metal reflective layer. These layers may include a layer that exhibits satisfactory adhesion to the metal coating layer and another layer that exhibits satisfactory adhesion to a black ink layer or other polymer coating layer. The inclusion of the second dielectric layers may help enhance adhesion of the polymer coating layer.

The light guide may be assembled with other components for an ambient light sensor such as an ambient light sensor die, diffusers, and other optical components such as infrared-light-blocking-and-visible-light-transmitting filters.

DETAILED DESCRIPTION

An electronic device may have optical components. The optical components may operate through transparent portions of a device that serve as optical component windows and that allow light to pass between the exterior and interior of the device. The optical components may include, for example, light sensors such as ambient light sensors and other components that detect and/or emit light.

Ambient light sensors may be used to gather measurements of ambient light intensity and color. During operation of an electronic device, display adjustments may be made and other actions may be taken based on ambient light sensor measurements. For example, display brightness may be adjusted based on measurements of ambient light intensity and display color cast may be adjusted based on measurements of ambient light color.

Optical component windows are sufficiently transparent to allow light to pass from the interior of the electronic device to the exterior of the electronic device and to allow light to pass from the exterior of the electronic device to the interior. For example, an ambient light sensor window is sufficiently transparent to allow visible light from the exterior of an electronic device to pass to an ambient light sensor in the interior that is aligned with the ambient light sensor window.

To accommodate an optical component such as an ambient light sensor within the interior of an electronic device, the optical component may be provided with a light guide. As an example, a light guide may be coupled between an ambient light sensor window and an ambient light sensor. During operation, the light guide guides light from the ambient light sensor window to the ambient light sensor, so that the ambient light sensor may make ambient light measurements.

In general, light guides may be used to convey light to or from any optical component that receives and/or emits light (e.g., proximity sensors, camera flash devices, time-of-flight sensors, status indicator lights, etc.). Configurations in which light guides are used to convey light to ambient light sensors are sometimes described herein as examples.

Figure 1:
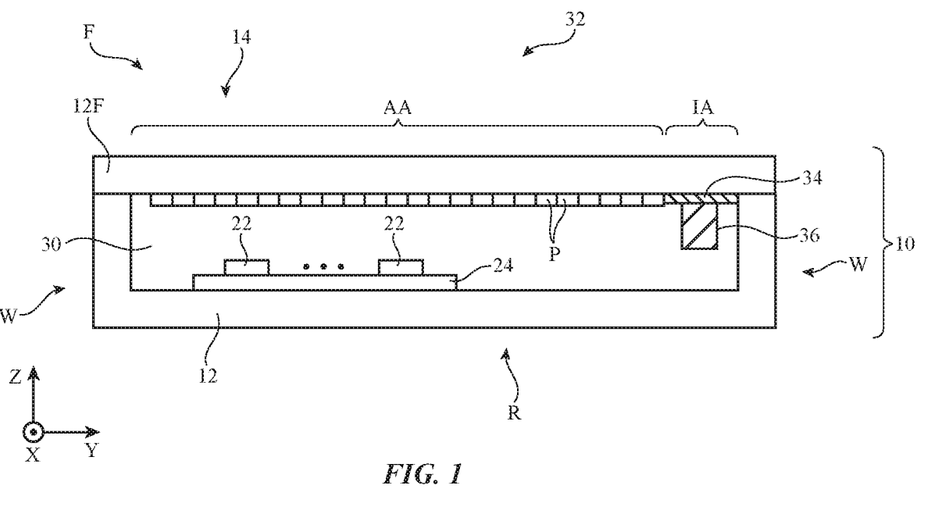
FIG. 1 is a cross-sectional side view of an illustrative electronic device with an optical component such as an ambient light sensor in accordance with an embodiment.

A cross-sectional side view of an illustrative electronic device with a waveguide-based ambient light sensor assembly is shown in FIG. 1. Electronic device 10 may have a display such as display 14 mounted in a housing such as housing 12. Device 10 of FIG. 1 is a portable device such as a cellular telephone, wristwatch device, or tablet computer. Other types of electronic devices may be provided with ambient light sensors if desired. Electronic device 10 may be, for example, a computing device such as a laptop computer, a media player, a pendant device, a display, a gaming device, a head-mounted device, a desktop computer with an integrated display, an embedded system such as a system mounted in a kiosk or automobile, or other electronic equipment.

Housing 12 may be formed from polymer, metal, glass, crystalline material such as sapphire, ceramic, fabric, fibers, fiber composite material, natural materials such as wood and cotton, other materials, and/or combinations of such materials. Housing 12 may be configured to form housing walls. The housing walls may enclose an interior region such as interior region 30 within device 10 and may separate interior region 30 from an exterior region such as exterior region 32 surrounding device 10. The housing walls may include a rear wall on rear side R of device 10, sidewalls on edges W of device 10, and a transparent housing wall that serves as a display cover layer on front side F of device 10. Front side F opposes rear side R of device 10 in the illustrative configuration of FIG. 1. Other arrangements may be used for forming housing 12 in device 10, if desired.

Display 14 may be a liquid crystal display, an organic light-emitting diode display, or other suitable display. Display 14 may have an array of pixels P. The portion of housing 12 that overlaps display 14 may sometimes be referred to as a display cover layer. The display cover layer (e.g., display cover layer 12F in the example of FIG. 1) may be formed from glass, crystalline material such as sapphire, clear polymer, other transparent materials, and/or combinations of these materials. The display cover layer may be coupled to metal housing walls or other housing structures in housing 12 and may sometimes be referred to as forming transparent housing structures or a transparent housing wall.

Display cover layer 12F may overlap active area AA of display 14 on front side F of device 10. During operation, pixels P of active area AA may display an image for viewing by a user of device 10. One or more portions of display cover layer 12F may also overlap inactive display areas such as inactive area IA. Inactive area IA may contain display driver circuitry and other components, but does not include pixels and does not display images. Inactive area IA may, as an example, form a notch at one end of device 10. Configurations in which inactive area IA forms a border that runs along one or more peripheral edges of device 10 or in which inactive area IA forms an isolated island surrounded by pixels P in active area AA may also be used.

Opaque material may be formed as a coating on an inner surface of the display cover layer in inactive area IA, as shown by opaque coating layer 34. This opaque coating layer, which may sometimes be referred to as an opaque masking layer, ink layer, opaque ink layer, etc., may be black (e.g., black ink formed from black dye and/or black pigment in a polymer), may be white, gray, silver, or other neutral colors, or may have a non-neutral color (e.g., red, blue, yellow, etc.). In some configurations, the opaque coating layer may be formed from multiple sublayers. The opaque coating layer may be visible from the exterior of device 10 (e.g., through peripheral portions of the display cover layer. Due to the presence of the opaque coating layer in inactive area IA, display driver circuitry and other components in inactive area IA may be hidden from view from the exterior of device 10.

Optical components may be mounted within device 10. For example, an ambient light sensor may be mounted within interior 30 and may make ambient light measurements on ambient light received through display cover layer 12F. In some configurations, ambient light may be received through transparent portions of active area AA. In the example of FIG. 1, ambient light sensor assembly 36 is mounted under inactive area IA and is configured to receive light through a portion of inactive area IA.

The portion of device 10 through which ambient light sensor assembly 36 receives ambient light from exterior region 32 may sometimes be referred to as an ambient light sensor window. An ambient light sensor window may be formed in any suitable portion of housing 12. For example, an ambient light sensor window may be formed within an opaque portion of housing 12 (e.g., in a wall on an edge W or rear side R). If desired, an ambient light sensor window may, as shown in the example of FIG. 1, be formed within a portion of layer 34. In this type of configuration, a portion of layer 34 may be provided with perforations or other openings, locally thinned opaque material (sufficiently thin to allow light to pass), selectively altered coating materials (e.g., ambient light sensor window ink that is at least partly transparent and/or has desired spectral properties), thin-film interference filter coating structures, other suitable window structures, and/or combinations of these structures.

Ambient light sensor windows may be provided with sufficient transparency to allow ambient light to pass from exterior 32 to components in interior 30 such as ambient light sensor assembly 36. This allows ambient light sensor readings to be taken during the operation of device 10.

As shown in FIG. 1, electrical components 22 may be mounted in interior 30 of device 10 (e.g., on a substrate such as printed circuit 24 located between display cover layer 12F on front side F and an opposing rear housing wall on rear side R). Components 22 may include integrated circuits, discrete components, light-emitting components, sensors, and/or other circuits. Electrical components 22 may include control circuitry. The control circuitry may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in the control circuitry may be used to control the operation of device 10. For example, the processing circuitry may use sensors and other input-output circuitry to gather input and to provide output, to transmit signals to external equipment, to adjust display 14 (e.g., to adjust display brightness and/or color cast to control the brightness and/or color cast of images on display 14 in response to measurements from a color ambient light sensor such as ambient light color and/or ambient light intensity), and/or to perform other tasks. The processing circuitry may be based on one or more microprocessors, microcontrollers, digital signal processors, baseband processors, power management units, audio chips, application specific integrated circuits, etc. The control circuitry may include wired and/or wireless communications circuitry (e.g., antennas and associated radio-frequency transceiver circuitry such as cellular telephone communications circuitry, wireless local area network communications circuitry, etc.). The communications circuitry of the control circuitry may allow device 10 to communicate with other electronic devices. For example, the control circuitry (e.g., communications circuitry in the control circuitry) may be used to allow wired and/or wireless control commands and other communications to be conveyed between devices such as cellular telephones, tablet computers, laptop computers, desktop computers, head-mounted devices, handheld controllers, wristwatch devices, other wearable devices, keyboards, computer mice, remote controls, speakers, accessory displays, accessory cameras, and/or other electronic devices.

Wireless communications circuitry may, for example, wirelessly transmit control signals and other information to external equipment in response to receiving user input or other input from sensors or other devices in components 22.

Input-output circuitry in components 22 of device 10 may be used to allow data to be supplied to device 10 and to allow data to be provided from device 10 to external devices. The input-output circuitry may include input devices that gather user input and other input and may include output devices that supply visual output, audible output, or other output.

Output may be provided using light-emitting diodes (e.g., crystalline semiconductor light-emitting diodes for status indicators and/or displays, organic light-emitting diodes in displays and other components), lasers, and other light-emitting devices, audio output devices (e.g., tone generators and/or speakers), haptic output devices (e.g., vibrators, electromagnetic actuators, piezoelectric actuators, and/or other equipment that supplies a user with haptic output), and other output devices.

The input-output circuitry of device 10 (e.g., the input-output circuitry of components 22) may include sensors. Sensors for device 10 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into a display, a two-dimensional capacitive touch sensor and/or a two-dimensional force sensor overlapping a display, and/or a touch sensor or force sensor that forms a button, trackpad, or other input device not associated with a display), and other sensors. Touch sensors for a display or for other touch components may be based on an array of capacitive touch sensor electrodes, acoustic touch sensor structures, resistive touch components, force-based touch sensor structures, a light-based touch sensor, or other suitable touch sensor arrangements. If desired, a display may have a force sensor for gathering force input (e.g., a two-dimensional force sensor may be used in gathering force input on a display).

If desired, the sensors may include optical sensors such as optical sensors that emit and detect light, ultrasonic sensors, optical touch sensors, optical proximity sensors, and/or other touch sensors and/or proximity sensors, monochromatic and color ambient light sensors in an assembly such as ambient light sensor assembly 36, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors.

In some configurations, components 22 may include mechanical devices for gathering input (e.g., buttons, joysticks, scrolling wheels, key pads with movable keys, keyboards with movable keys, and other devices for gathering user input). During operation, device 10 may use sensors and/or other input-output devices in components 22 to gather user input (e.g., buttons may be used to gather button press input, touch and/or force sensors overlapping displays can be used for gathering user touch screen input and/or force input, touch pads and/or force sensors may be used in gathering touch and/or force input, microphones may be used for gathering audio input, etc.). The control circuitry of device 10 can then take action based on this gathered information (e.g., by transmitting the information over a wired or wireless path to external equipment, by supplying a user with output using a haptic output device, visual output device, an audio component, or other input-output device in housing 12, etc.). For example, the control circuitry of device 10 may gather information on ambient light color and ambient light intensity using an ambient light sensor and may use this information in adjusting the brightness and color cast of display 14.

If desired, electronic device 10 may include a battery or other energy storage device, connector ports for supporting wired communications with ancillary equipment and for receiving wired power, and other circuitry. In some configurations, device 10 may serve as an accessory and/or may include a wired and/or wireless accessory (e.g., a keyboard, computer mouse, remote control, trackpad, etc.).

Ambient light sensor windows and other optical component windows in device 10 transmit sufficient light to allow aligned optical components to receive or emit light. For example, ambient light sensors that are overlapped by ambient light sensor widows may gather ambient light measurements through the windows. The transmission of an ambient light sensor window may be, for example, at least 0.5%, at least 1%, at least 2%, at least 10%, at least 50%, less than 100%, less than 60%, less than 20%, or other suitable value.

Figure 2:
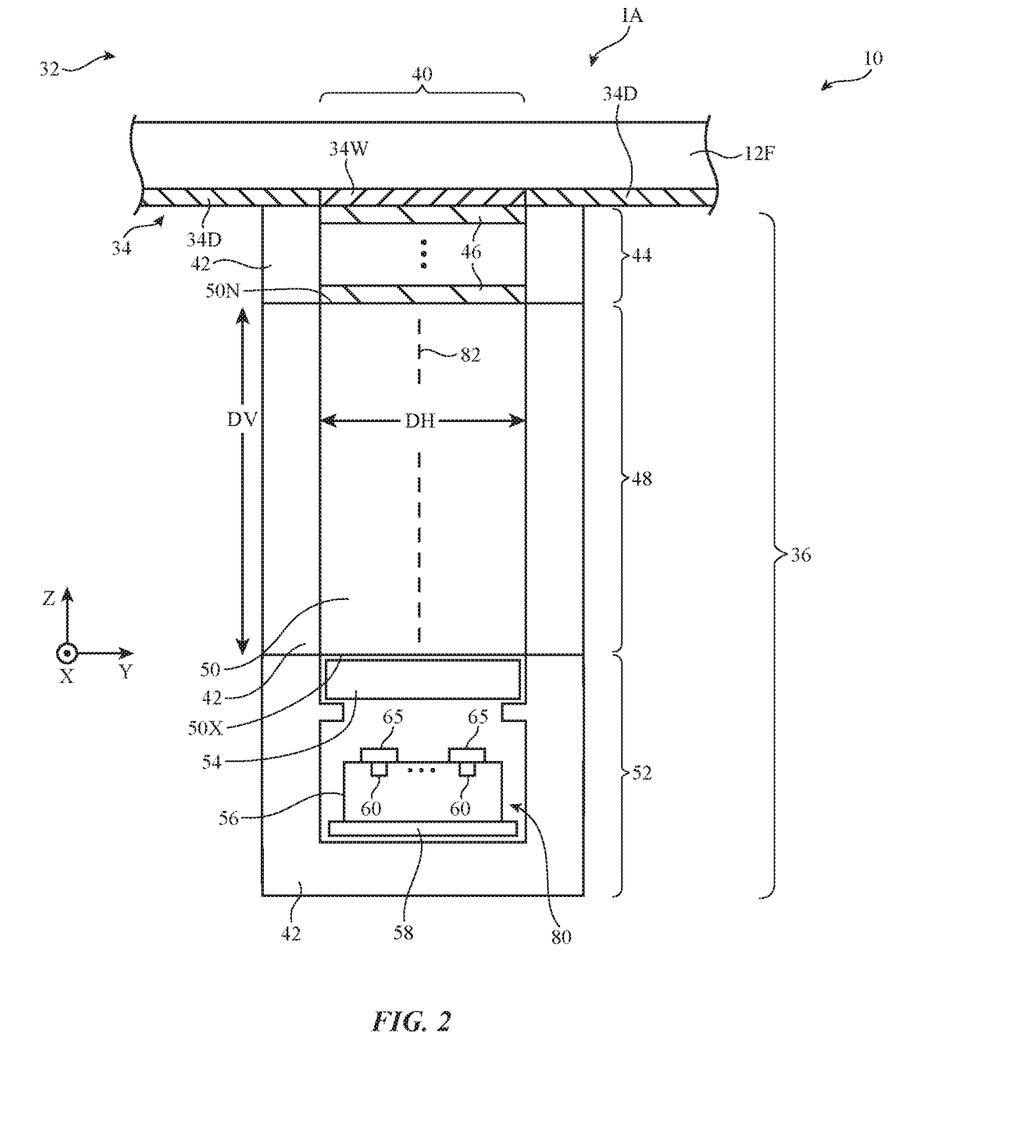
FIG. 2 is a cross-sectional side view of a portion of an illustrative ambient light sensor assembly in accordance with an embodiment.

FIG. 2 is a cross-sectional side view of a portion of electronic device 10 that includes ambient light sensor assembly 36. In the example of FIG. 2, layer 34 in inactive area IA includes opaque material 34D (e.g., a black ink coating or other opaque material) and includes ambient light sensor window material 34W (e.g., a coating of black ambient light sensor ink or other structure that is sufficiently transparent to ambient light to allow ambient light sensor assembly 36 to gather ambient light sensor readings). Ambient light sensor window 40 may be any suitable shape. For example, window 40 and underlying structures in assembly 36 may have a circular footprint when viewed along the Z axis, a rectangular footprint, a square footprint, or other suitable shape.

Ambient light sensor assembly 36 includes one or more support structures 42 that serve as a package and mounting structure for ambient light sensor components. These support structures may be formed from black polymer or other material. Adhesive and other coupling structures may be used to couple support structures together.

Assembly 36 may include ambient light sensor 80. Assembly 36 may also include light guide 50 in central portion 48 for guiding ambient light that is received through ambient light sensor window 40 to ambient light sensor 80. Optional optical structures may be interposed between light guide 50 and window 40 and between light guide 50 and sensor 80. For example, optical system 44 may be interposed between light guide 50 and window 40 and optical system 54 may be interposed between light guide 50 and ambient light sensor 80.

Optical system 44 may include one or more optical elements 46 (e.g., diffuser layers, infrared-light-blocking-and-visible-light-transmitting filters, etc.). Optical system 54 may include one or more optical elements 54 (e.g., infrared-light-blocking-and-visible-light-transmitting filter(s), etc.). Optical filters in systems 44 and/or 54 may be used to block undesired wavelengths of light (e.g., infrared and/or ultraviolet light) while passing desired wavelengths of light (e.g., visible wavelengths) to ambient light sensor 80. If desired, light diffusing and/or light filtering capabilities may be incorporated into light guide 50 in addition to or instead of using components in systems 44 and/or 54 to perform these functions.

Ambient light sensor 80 may be mounted on a substrate such as substrate 58 (e.g., a printed circuit with signal lines coupled to signal lines in other printed circuits in device 10). Ambient light sensor 80 may be formed from a semiconductor die 56 (e.g., a silicon die) with multiple photodetectors 60. Each photodetector 60 may have a corresponding color filter 65 through which light passes before reaching that photodetector. Color filters 65 may be formed from colored polymer layers or other materials that pass particular bands of wavelengths (e.g., different colors of light) and/or may be formed from thin-film interference filters with different pass bands. As an example, color filters 65 may include a first color filter that passes red light, a second color filter that passes blue light, and additional color filters that pass light of different colors. With this type of arrangement, different photodetectors 60 detect light of different colors. A multichannel light sensor such as sensor 80 of FIG. 2 may therefore measure the relative contribution of each color of light that is present and may therefore serve as a color ambient light sensor that measures both the total light intensity of ambient light and ambient light color. Ambient light color measurements may be gathered as color coordinates, a color temperature, a correlated color temperature, a light spectrum, or as color measurement data represented using other color measurement formats. There may be, for example, at least 3, at least 6, at least 10, fewer than 20, fewer than 9, or other suitable number of photodetectors 60 on die 56.

Ambient light sensor 80 may be mounted within ambient light sensor assembly 36 in alignment with exit 50X of light guide 50. During operation, ambient light from exterior 32 passes through window 40 and the optical components of system 44, enters entrance 50N of light guide 50, is guided along longitudinal axis 82 of light guide 50, exits exit 50X of light guide 50, passes through system 54, and is received and measured by ambient light sensor 80.

Light guide 50 may have a shape and size that helps accommodate ambient light sensor 80 within the interior of device 10 (e.g., by moving sensor 80 into an interior portion of device 10 where there is sufficient room to accommodate sensor 80).

In general, light guide 50 may have any suitable dimensions. For example, longitudinal (height) dimension DV may have a value of 1.7 mm, at least 0.1 mm, at least 1 mm, at least 10 mm, less than 30 mm, less than 3 mm, less than 0.3 mm, or other suitable length and lateral dimensions DH (distances along the X and/or Y axes) may be 0.7 mm, at least 0.1, at least 0.5 mm, at least 1 mm, at least 10 mm, less than 20 mm, less than 5 mm, less than 0.5 mm, or other suitable lateral dimension. The size of light guide 50 along the X and Y dimensions may be equal or may be different. Light guide 50 may have a footprint when viewed along the Z axis that is circular, oval, square, rectangular, that has curved and/or straight edges, etc. The ratio of DV to the smallest lateral dimension DH of light guide 50 may be at least 0.5, at least 1, at least 1.5, at least 2, at least 5, less than 10, less than 4, less than 2.5, less than 1, or other suitable ratio.

Figure 3:
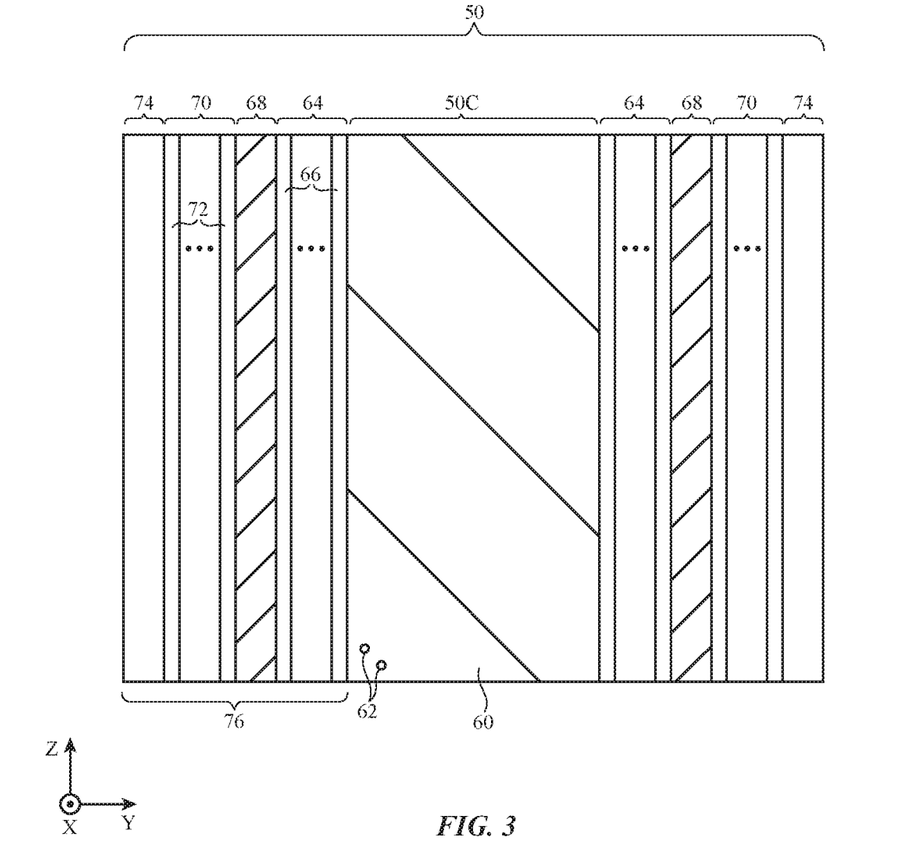
FIG. 3 is a cross-sectional side view of an illustrative coated light guide in accordance with an embodiment.

To help confine ambient light that is passing through light guide 50, light guide 50 may be provided with a reflective coating. The reflective coating may, for example, include a layer of metal or other reflective material. FIG. 3 is a cross-sectional side view of an illustrative light guide of the type that may include a reflective coating layer. In the illustrative configuration of FIG. 3, light guide 50 includes light guide core 50C. Light guide core 50C may be formed from transparent material 60 (e.g., a block of clear polymer, glass, etc.). Material 60 may, if desired, be configured to serve as a spectral filter. For example, material 60 may be blue glass or other material that absorbs infrared light and that therefore serves as an infrared-light-blocking filter.

If desired, light-scattering structures 62 may optionally be embedded in material 60. Structures 62 may include voids, gas-filled bubbles, particles with a refractive index that differs from the refractive index of material 60 (e.g., inorganic dielectric particles), and/or other light-scattering structures. Texture may, if desired, be added to the entrance and/or exit surfaces of core 50C to help diffuse light. With textured surfaces and/or embedded light-scattering structures 62, light guide core 50C may exhibit a haze of at least 10%, at least 50%, less than 99%, or other suitable value.

Some or all of the sides of core 50C (other than the entrance and exit surfaces of core 50C) may be covered with reflective coating layer 68 to help confine light that is traveling along core 50C (e.g., along longitudinal axis 82 of FIG. 2). Layer 68 may be formed from a reflective material such as metal (e.g., aluminum, silver, gold, a metal alloy, or other metal coating). During operation, layer 68 may help confine light within core 50C due to the reflective nature of the material forming layer 68 rather than the principal of total internal reflection. Layer 68 may be a thin-film layer with a thicknesses of 0.150 microns, at least 0.03 microns at least 0.08 microns, less than 0.35 microns, less than 2 microns, less than 1 micron, less than 0.3 microns, at least 0.01 microns, at least 0.1 microns, at least 0.6 microns, or other suitable thicknesses.

Optional dielectric layer 64 may be interposed between reflective coating layer 68 and core 50C. Layer 64 may contain one or more dielectric layers 66 (e.g., thin-film inorganic dielectric layers). As an example, an innermost layer of layers 66 may be formed from a material with satisfactory adhesion to core 50C (e.g., a silicon oxide layer that adheres to core 50C in a configuration in which core 50C is formed from glass). In arrangements in which layer 68 is formed from a metal such as aluminum, the outermost of layers 66 may be formed from a dielectric with satisfactory adhesion to aluminum (e.g., aluminum oxide). As an illustrative example, layer 66 may contain a silicon oxide layer (e.g., a 50-150 nm silicon oxide layer), a titanium oxide layer (e.g., a 30-120 nm titanium oxide layer), a silicon oxide layer (e.g., a 30-120 nm thick silicon oxide layer), and an aluminum oxide layer (e.g., a 10-50 nm aluminum oxide layer). In general, there may be any suitable number of layers 66 in layer 64 (e.g., 3-6, at least 2, at least 3, at least 5, fewer than 10, fewer than 7, 4, etc.). These layers may be thin-film layers deposited by physical vapor deposition or other suitable deposition processes.

The stack of the dielectric thin-films that make up layer 64 may be provided with thicknesses and refractive index values that enhance the reflection of light rays from the interface between core 50C and the coating on core 50C (e.g., this stack of thin films may form a thin-film interference filter mirror structure with a high reflectivity at a range of angles associated with the angles of light rays traveling down the length of core 50C). In addition to forming a thin-film interference mirror for light rays in core 50C, layer 64 forms an adhesion promotion layer that helps attach layer 68 to the outer surface of core 50C. Layers 66 and/or layer 64 may have thicknesses of less than 2 microns, less than 1 micron, less than 0.3 microns, at least 0.01 microns, or other suitable thicknesses.

Optional outer thin-film coating layer 70 may be formed on the outer surface of layer 68. Layer 70 may include one or more thin-film coating layers 72. Layers 72 and/or layer 70 may have thicknesses of less than 2 microns, less than 1 micron, less than 0.3 microns, at least 0.01 microns, or other suitable thicknesses. An innermost layer of layers 72 may be formed from a material with satisfactory adhesion to layer 68 (e.g., an aluminum oxide layer in a scenario in which layer 68 is formed from aluminum). An outermost layer of layers 72 (or all of layer 70 in an arrangement in which layer 70 contains only a single layer 72) may be a silicon oxide layer to promote adhesion of a polymer coating layer such as optional polymer coating layer 74. As an example, an innermost of layers 72 may be an aluminum oxide layer with a thickness of 0.01-0.08 microns, a second-to-innermost of layers 72 may be a 0.02-0.1 microns silicon oxide layer, a third-to-innermost of layers 72 may be a titanium oxide layer with a thickness of 0.02-0.08 microns, and an outermost (fourth-to-innermost) of layers 72 may be a silicon oxide layer with a thickness of 0.03-0.15 microns.

Coating layer 74 may be formed from black ink (e.g., polymer with embedded black colorant such as black dye and/or pigment) or other suitable coating material. Layer 74 may help absorb stray light and may help prevent scratching to core 50C and the coatings on core 50C during assembly. During manufacturing, black polymer or other material may be molded over coating layer 74 (e.g., to form part of structures 42 of FIG. 2). If desired, coating layer 74 may be omitted.

The coatings on light guide core 50C of FIG. 3 may be relatively thin, which can reduce the volume occupied by light guide 50 and assembly 36. These coatings may be resistant to moisture-induced delamination and may therefore exhibit satisfactory reliability. Resistance to damage during unintentional drop events may be enhanced by forming an optional diffuser from light-scattering structures 62 in material 60. Light guide 50 may exhibit high light transmission (e.g., at least 40%, at least 50%, at least 70%, or less than 90% end to end) and therefore may exhibit small light losses and measurement noise. Although illustrated in the context of a straight light guide, light guide structures for light guide 50 may have any suitable shapes (e.g., shapes with bends along the length of light guide 50, etc.).

Light guide 50 may be used to transmit light from window 40 to light sensor 80 and may be used in other light-based devices. For example, light guide 50 may be used in a proximity sensor that emits infrared light and detects infrared light. In this type of configuration, the sensor may use light guide 50 to guide light from a light-emitting diode, laser, or other light emitter to exterior 30 and may use a light guide such as light guide 50 to guide light from exterior 30 to an infrared light detector. Light guide 50 may also be used with other optical components such as light-emitting devices that serve as status indicators lights, camera flash components, time-of-flight sensors, etc.

Device 10 may be operated in a system that uses personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

| Table of Reference Numerals | | | |
|---|---|---|---|
| 10 | Electronic Device | 12 | Housing |
| 14 | Display | P | Pixels |
| 36 | Ambient Light Sensor Assembly | 34 | Coating Layer |
| 30 | Interior | F | Front Side |
| R | Rear side | AA | Active Area |
| IA | Inactive Area | 32 | Exterior Region |
| 30 | Interior Region | 12F | Display Cover Layer |
| W | Edges | 22 | Components |
| 24 | Printed Circuit | 34W | Window Material |
| 34D | Opaque Material | 42 | Support Structures |
| 46 | Components | 44 | Optical System |
| DV | Dimension | DH | Dimension |
| 82 | Longitudinal Axis | 48 | Central Portion |
| 50 | Light Guide | 50N | Entrance |
| 50X | Exit | 54 | Optical System |
| 65 | Color Filters | 60 | Photodetectors |
| 56 | Die | 80 | Ambient Light Sensor |
| 58 | Printed Circuit | 62 | Light-scattering Structures |
| 60 | Materia | 50C | Core |
| 64 | Dielectric Layer | 66 | Dielectric Layers |
| 68 | Reflective Coating Layer | 70 | Dielectric Layer |
| 72 | Dielectric Layers | 74 | Polymer Layer |

What is claimed is:

1. An electronic device, comprising:
   a housing;
   an ambient light sensor window;
   an ambient light sensor in the housing; and
   a light guide in the housing between the ambient light sensor window and the ambient light sensor, wherein the light guide has a core, a metal coating, and a dielectric layer between the metal coating and the core, and wherein the dielectric layer comprises a thin-film interference filter formed from a stack of multiple thin-film coatings.

2. The electronic device defined in claim 1 wherein the stack of multiple thin-film coatings is configured to reflect light traveling through the core.

3. The electronic device defined in claim 2 wherein the metal coating comprises a metal coating layer selected from the group consisting of: an aluminum coating layer, a silver coating layer, and a gold coating layer.

4. The electronic device defined in claim 3 wherein the core comprises a core selected from the group consisting of: a glass core and a polymer core, and wherein the stack of multiple thin-film coatings comprises an innermost layer on an exterior surface of the core that is formed from silicon oxide.

5. The electronic device defined in claim 3 wherein the metal coating layer is an aluminum coating layer and wherein the stack of multiple thin-film coating layers comprises an outermost layer adjacent to the aluminum coating layer that is formed from aluminum oxide.

6. The electronic device defined in claim 2 further comprising light-scattering structures in the core.

7. The electronic device defined in claim 1 further comprising an additional dielectric layer on an outer surface of the metal coating.

8. The electronic device defined in claim 7 further comprising a polymer coating on the additional dielectric layer.

9. The electronic device defined in claim 8 wherein the additional dielectric layer comprises an aluminum oxide layer and a silicon oxide layer.

10. The electronic device defined in claim 1 wherein the ambient light sensor comprises a color ambient light sensor that is configured to measure ambient light color and ambient light intensity.

11. The electronic device defined in claim 10 further comprising:
    pixels that are configured to display an image; and
    control circuitry configured to adjust image color and intensity for the image based on the measured ambient light color and ambient light intensity.

12. An electronic device comprising:
    a transparent display cover layer;
    a light guide having an entrance configured to receive ambient light that has passed through the display cover layer, wherein the light guide has a core and has coating layers including a metal coating layer, a first dielectric layer between the metal coating layer and the core, and a second dielectric layer on an exterior surface of the metal coating layer;
    a color ambient light sensor configured to receive the ambient light after the ambient light has reflected from the coating layers while passing through the core;
    pixels; and
    control circuitry configured to adjust the pixels using a measurement from the color ambient light sensor.

13. The electronic device defined in claim 12 wherein the coating layers comprise a stack of multiple thin-film dielectric layers between the metal coating layer and the core.

14. The electronic device defined in claim 13 further comprising a polymer coating layer on the second dielectric layer.

15. The electronic device defined in claim 12 further comprising light-scattering structures embedded in the core.

16. An electronic device comprising:
    a housing configured to separate an interior region from an exterior region surrounding the housing;
    an optical component window in the housing;
    a light guide having first and second ends, wherein the first end is aligned with the optical component window, wherein the light guide has a core with a metal coating, and wherein the light guide comprises multiple thin-film dielectric layers between the metal coating and the core; and
    an optical component aligned with the second end.

17. The electronic device defined in claim 16 wherein the core has light-scattering structures, and wherein the optical component comprises an ambient light sensor.

* * * * *